United States Patent [19]
Castleman et al.

[11] Patent Number: 5,461,218
[45] Date of Patent: * Oct. 24, 1995

[54] ELECTRONIC KEY HAVING AN ELONGATED HANDLE AND REQUIRING NO ROTATION ABOUT THE HANDLE AXIS; METHOD OF USE THEREOF

[75] Inventors: Neal J. Castleman, Malibu; Roger Lynx, Los Angeles, both of Calif.

[73] Assignee: Lynx Systems, Inc., South Pasadena, Calif.

[*] Notice: The portion of the term of this patent subsequent to Jun. 21, 2011 has been disclaimed.

[21] Appl. No.: 262,968

[22] Filed: Jun. 21, 1994

Related U.S. Application Data

[63] Continuation of Ser. No. 902,681, Jun. 22, 1992, Pat. No. 5,322,992.

[51] Int. Cl.⁶ ............................ G06K 19/04; G06K 19/07
[52] U.S. Cl. ............................................ 235/382; 235/492
[58] Field of Search ............................. D8/347; 235/375, 235/472, 492, 382, 441; 70/276, 278, 382, 337

[56] References Cited

U.S. PATENT DOCUMENTS

| D. 348,603 | 7/1994 | Castleman et al. | D8/347 |
|---|---|---|---|
| 4,449,126 | 5/1984 | Pekker | 70/382 X |
| 4,474,042 | 10/1984 | Patriquin | 70/337 |
| 4,631,939 | 12/1986 | Herriott | 70/276 X |
| 4,752,679 | 6/1988 | Wehrmacher | 235/382 |
| 4,789,859 | 12/1988 | Clarkson et al. | 235/382 X |
| 4,914,281 | 4/1990 | Benton et al. | 235/375 X |
| 5,025,141 | 6/1991 | Bolan | 235/472 |
| 5,195,341 | 3/1993 | Nieuwkoop | 70/278 |
| 5,322,922 | 6/1994 | Castleman et al. | 235/492 |

*Primary Examiner*—Aristotelis Psitos
*Assistant Examiner*—Patrick Wamsley
*Attorney, Agent, or Firm*—Ashen Golant & Lippman

[57] ABSTRACT

A compact hand-holdable implement or key for controlling an electronic lock mechanism is disclosed. The implement is sized and configured for easy, convenient and comfortable gripping, aligning with a mating receptacle of the lock mechanism, and bringing into and out of desired engagement with the receptacle. The illustrated implement includes a memory chip. It has an elongated handle with a front-to-rear axis and electrical implement contacts at its front end connected to the memory chip. The user grips the handle with the user's thumb and at least one finger generally aligned with the handle axis for clear visibility of the front end and the receptacle. This also allows for easy and comfortable combined movement which both aligns the implement with the receptacle and moves it forwardly into the receptacle. The implement contacts are arranged to be engaged with and then disengaged from mating lock contacts in the receptacle, solely by axial movement of the implement and without requiring rotational or transverse movement of the implement. This initiates desired transfer of data from the memory chip to the lock mechanism. A new and advantageous method of use and method of assembly of the implement are also disclosed.

23 Claims, 4 Drawing Sheets

FIG. 5 ically operated lock. Each electronic key contains a
ELECTRONIC KEY HAVING AN ELONGATED HANDLE AND REQUIRING NO ROTATION ABOUT THE HANDLE AXIS; METHOD OF USE THEREOF This is a continuation of application Ser. No. 07/902,681, filed on Jun. 22, 1992, now U.S. Pat. No. 5,322,992.

RELATED PATENT DOCUMENT

A related document is U.S. patent application Ser. No. 07/901,892, filed in the United States Patent and Trademark Office on the same date as this document and entitled "SELF-CONTAINED ELECTRONIC LOCK WITH CHANGEABLE MASTER AND SLAVE CODES."

FIELD OF THE INVENTION

The present invention relates generally to electronic keys or implements to open or otherwise control a self-contained electronically operated lock. Each electronic key contains a respective key code, and the lock may be preprogrammed to be opened only by predetermined key codes.

BACKGROUND OF INVENTION

There has been a wide variety of electronic mechanisms for locking and securing things. In this connection cards, badges, variously shaped and configured keys and the like having electronic or electromagnetic data imprinted upon them have been used in connection with readers (with or without computer support) to identify and control locking and unlocking of the mechanisms and access to various facilities and devices. Many of these arrangements are extremely sophisticated and expensive to initially install, as well as to maintain and to reprogram.

Dallas Semiconductor of Dallas, Tex. has developed what they call their "Touch Memory" chip that is able to read or write with momentary contact. They have housed this chip as described in U.S. Pat. No. 5,025,141 in a stainless steel container which they call their "MicroCan". This coin-shaped container is 16.3 mm in diameter and 3.2/5.8 mm in height. They have mounted it with one flat circular face of the can secured to the flat surface of a generally rectangular thin flat ID card or a thin flat generally oblong-shaped key fob (See FIG. 1). The user holds and manipulates the card or fob so as to insert the "MicroCan" into a generally forwardly facing lock receptacle.

Such manipulation of this type of device is awkward and difficult to the point of being merely annoying for some, but virtually unusable for others. The motion involved to position the "MicroCan" in the proper orientation with regard to the lock mechanism receptacle and then insert the "Micro-Can" into the receptacle is not one that is usual or comfortable for most people. It involves first a side-to-side and up-and-down aligning with a receptacle that is, to a large extent, blocked from view by the hand of the user and by the card or fob structure. This alignment cannot be approximated, but must be rather exact for the following reason: the "MicroCan" must make sufficient electrical contact at its peripheral edge as well as at its flat forward face, so there must be a close contact fit between the peripheral edge of the "MicroCan" and the receptacle. In other words, there is a very close fit between the "MicroCan" and the receptacle. To the extent the user holds the card or fob away from the "MicroCan" to avoid blocking the user's view, the less aligned the user's hand is with the "MicroCan"; this increases the awkward feeling of the operation. The converse is also true: moving the user's hand closer to the "MicroCan" may lessen the awkward feeling but will tend to increase the interference with the user's free view of the "MicroCan" relative to the receptacle.

It is also noted that when gripping the card or fob for such an operation, the user's thumb and fingers are in general alignment with the plane of the card or fob but transverse to the direction of forward and rearward movement of the "MicroCan" into and out of the receptacle. This tends to amplify the sense and feeling that multiple successive movements are required: first, the transverse aligning movement in the direction the fingers are aligned, then the separate forward movement in a direction at right angles to the direction in which the fingers are aligned. If the alignment is inaccurate at first, additional transverse aligning and forward inserting movements are required.

It will also be noted that it is important that the forward face of the "Microcan" be generally parallel to the face of the receptacle during the insertion. This in turn requires that the long axis of the fob handle not only be generally parallel with the receptacle face but that the correct rotational attitude of the fob handle about the long axis be maintained.

Fumbling around to achieve such alignment and insertion tends to be frustrating, like struggling to insert a key in a dark hallway or at night.

SUMMARY OF THE DISCLOSURE

The key or implement of the present invention contemplates a compact key-size electronic hand-holdable implement that can be used in a very simple, straightforward and user-comfortable manner. The illustrated implement contains a memory chip and has a small elongated handle with a front-to-rear axis. There are a spaced-apart pair of electrical implement contacts at the front end of the implement that are connected to the memory chip.

In one preferred embodiment, the chip is in a T092 package.

A lock mechanism with which the implement interacts has a mating receptacle with a pair of spaced-apart electrical lock contacts. The implement contacts are arranged to engage with and to then disengage from the respective lock contacts solely by axial movement of the implement, without requiring rotational or transverse movement of the implement.

Figures 6, 7:
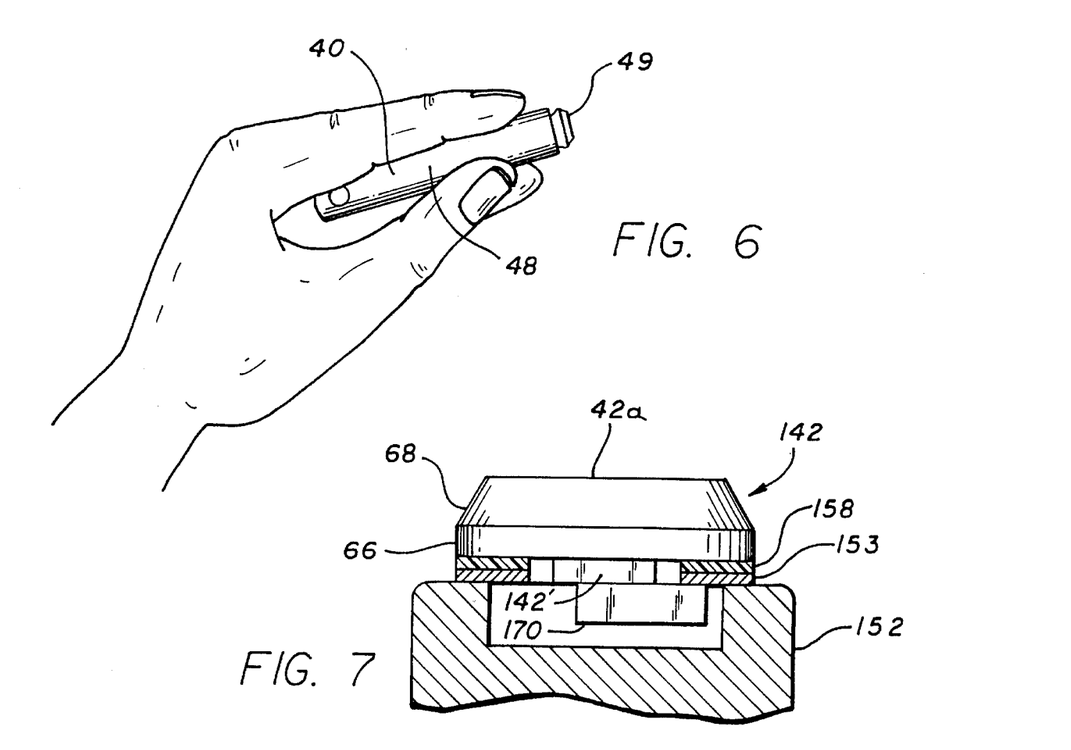
FIG. 6 is a perspective view of one hand of the user grasping the implement.
FIG. 7 is an elevation, greatly enlarged and partially in cross-section, of an alternative preferred embodiment for mounting of the memory chip.

As shown in FIG. 6, the user may simply grasp the small elongated handle with the thumb and at least one other finger aligned with the axis of the handle, which leaves the forward end of the implement in clear view. The user can then easily, and in essentially the same motion both align the front end with the receptacle by in effect pointing the fingers at the receptacle and insert the front end axially forwardly into the receptacle. Because both pointing and moving forward are in line with the user's fingers, this tends to feel to the user like a single motion.

Suitable guides are provided on the implement and the receptacle to facilitate the insertion. When the implement is inserted, the implement contacts engage, respectively, the lock contacts to achieve the desired electrical contact. The implement can then be withdrawn from this contact by simple reverse axial movement out and away from the receptacle.

Engagement of the contacts initiates data transfer from the implement memory chip through said contacts to the lock mechanism. In a form of the device where the engagement need only be momentary to achieve the required data transfer, the implement may be immediately withdrawn from the receptacle by simple axial movement. In such case, the withdrawal movement combines with the pointing and forward movement described above to provide the feel and sense to the user of a simple integrated action much like pressing and releasing a doorbell button.

In this way the implement may be used simply and easily and comfortably to lock or unlock the facility or equipment or to perform other functions such as to program or reprogram such lock mechanism. The size and configuration of the implement allows it to be readily kept by the user in a pocket, purse or the like with other keys if any, for convenient and easy access.

More particularly, the illustrated implement has a central inner contact and a circular or ring-like outer contact disposed around the central contact. The lock mechanism has a complementary arrangement of contacts, i.e., a central inner contact and a circular or annular ring-like outer contact. When the front end of the implement is aligned with and moved forward axially into the lock mechanism receptacle, the respective contacts are aligned—the inner contacts being engaged with one another and the outer contacts being engaged with one another. This provides the desired electrical connection required for transfer of data between the implement and the lock mechanism. Given this configuration, the rotational orientation of the implement does not affect or diminish the electrical engagement so long as the transverse alignment is sufficient. The insertion of the implement front end into the receptacle is aided by the provision of the guide means on the implement and on the lock mechanism receptacle. In this connection, in the illustrated apparatus, the inside lip of the receptacle outer contact ring is rounded and the forward end of the implement has a frustoconical shape. When the implement front end is inserted into the receptacle, the annular outer wall of the implement outer contact is brought into an electrical engagement with the annular inner wall of the lock mechanism outer contact. The central inner contacts of the implement and the lock mechanism both have generally flat transverse faces that are brought into direct abutting engagement with one another.

For ordinary lock applications as illustrated herein, operation of the lock is preferably initiated by a key engagement that is momentary; for vehicular and various other applications, however, operation may be preferably initiated by an engagement as protracted as operation of the vehicle etc.

Figures 3A, 3B, 3C:
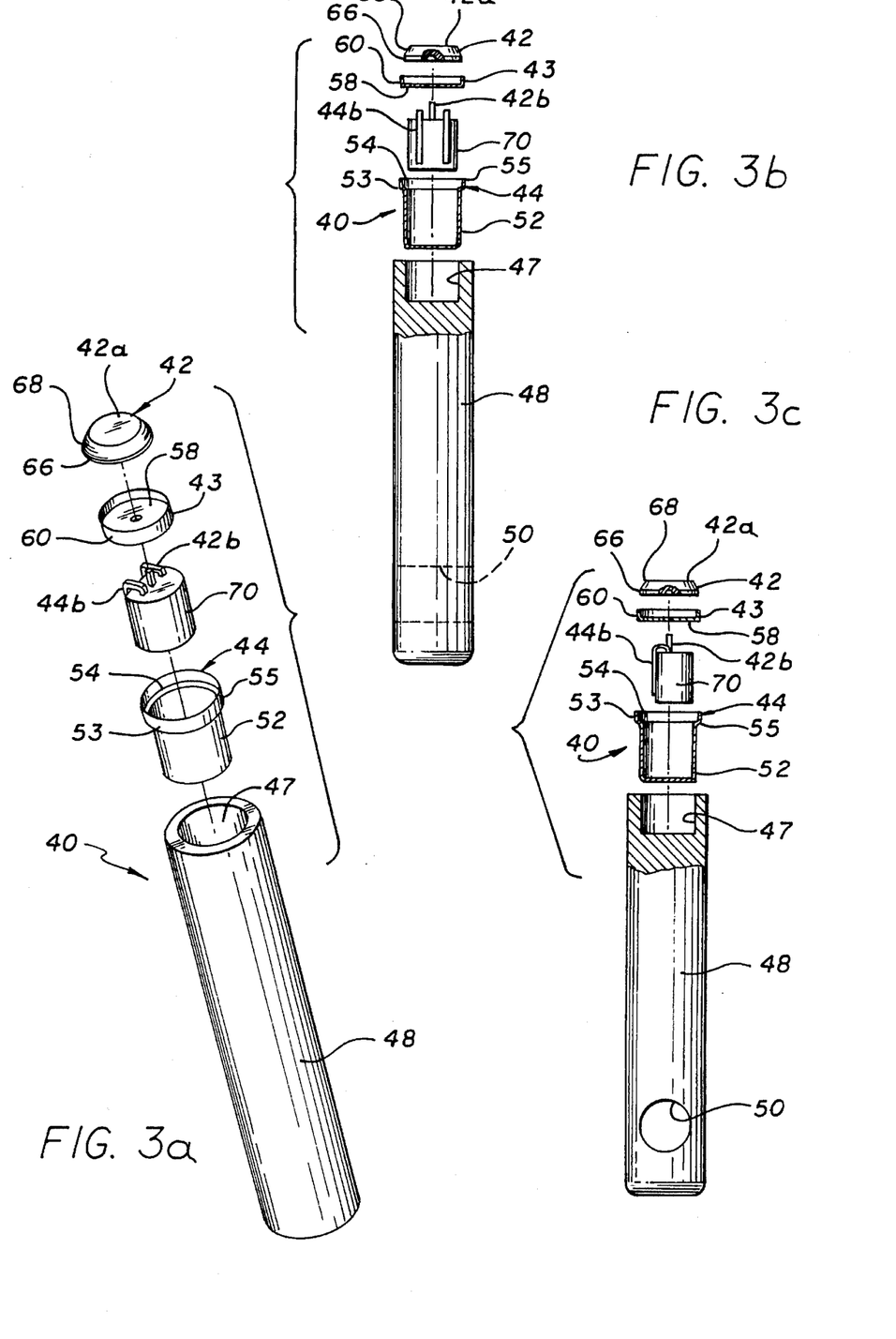
FIGS. 3a, 3b and 3c are schematic exploded perspective and side views of the components of the implement of FIG. 2.

As shown in FIGS. 3a, 3b and 3c the illustrated implement may be fabricated from a plurality of parts. A first part in the form of a cylindrical metal can is open at its forward end and closed at its other rear end. The forward end portion has an enlarged diameter relative to the remainder of the can. This enlarged end portion forms the outer electrical contact for the implement. The memory chip, preferably in its TO92 package, may be secured within the can. The main portion of the can rearwardly of the enlarged end portion is received in a cavity at the front end of the handle.

A cup-shaped insulating member having a transverse circular wall and an annular upright side wall is disposed within the confines of the enlarged outer end portion of the can.

Figure 5:
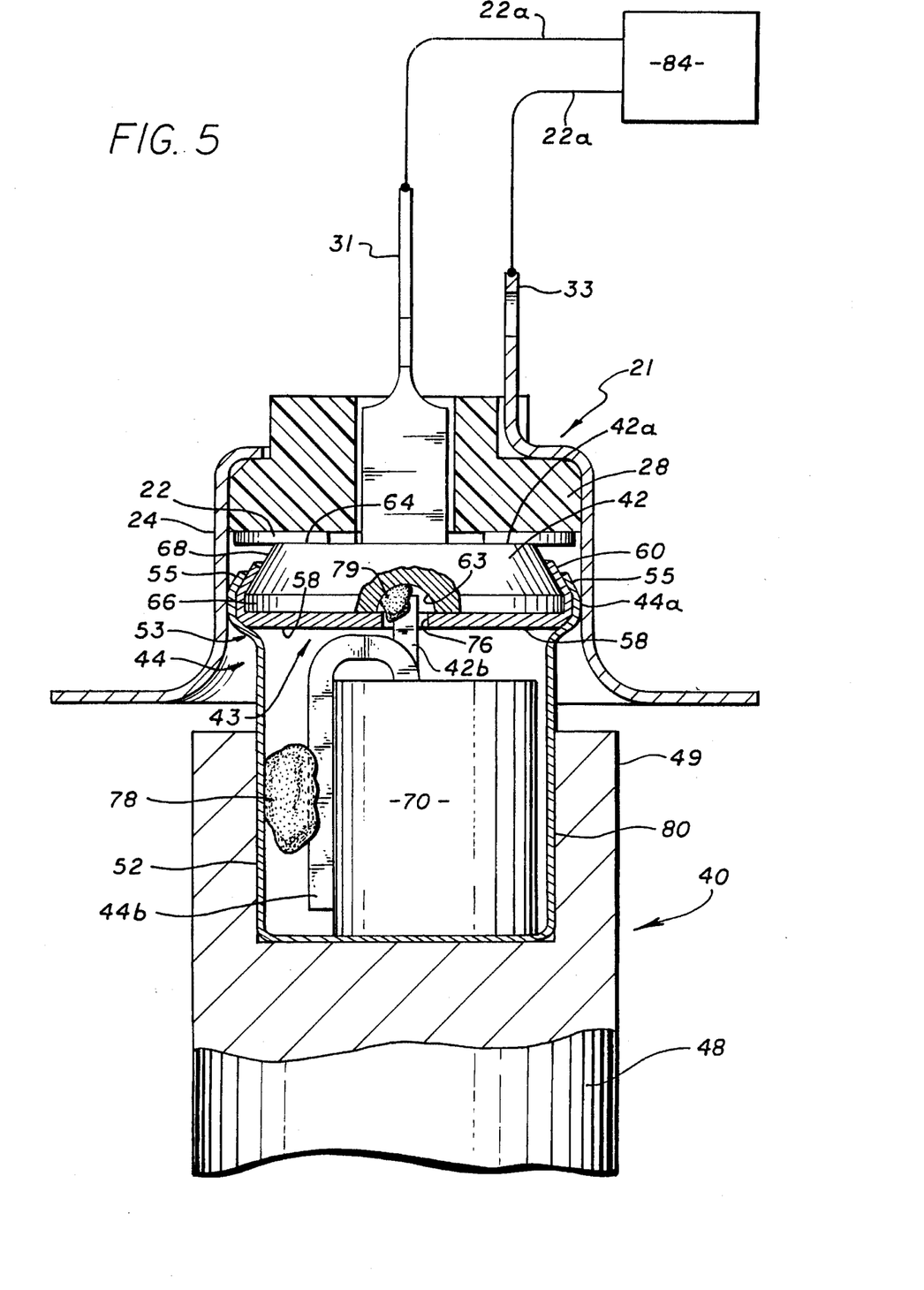
FIG. 5 is a schematic side sectional view of the implement partially inserted into the receptacle.

The inner contact is a generally disc-shaped metal piece having an annular outer surface that is bevelled radially inwardly toward the forward end. The inner contact is disposed within the cup-shaped insulating member. Then the enlarged outer end portion of the can is crimped radially inwardly over the adjacent portion of the inner contact bevelled forward end. This forms a mechanical lock which holds the inner and outer contacts in place relative to one another. The forward central portion of the inner contact remains exposed and the side wall of the insulator member serves to electrically separate the inner and outer contacts as shown in FIG. 5.

This is a particularly simple and effective construction for the implement, to provide the desired inner and outer implement contacts separated by suitable insulation. Both the inner and outer contacts are in electrical contact with the microprocessor chip as by suitable connector means.

The above-identified method of assembling the components of the illustrated implement is another aspect of the present invention.

DETAILED DESCRIPTION OF THE DRAWINGS

Figures 1, 2:
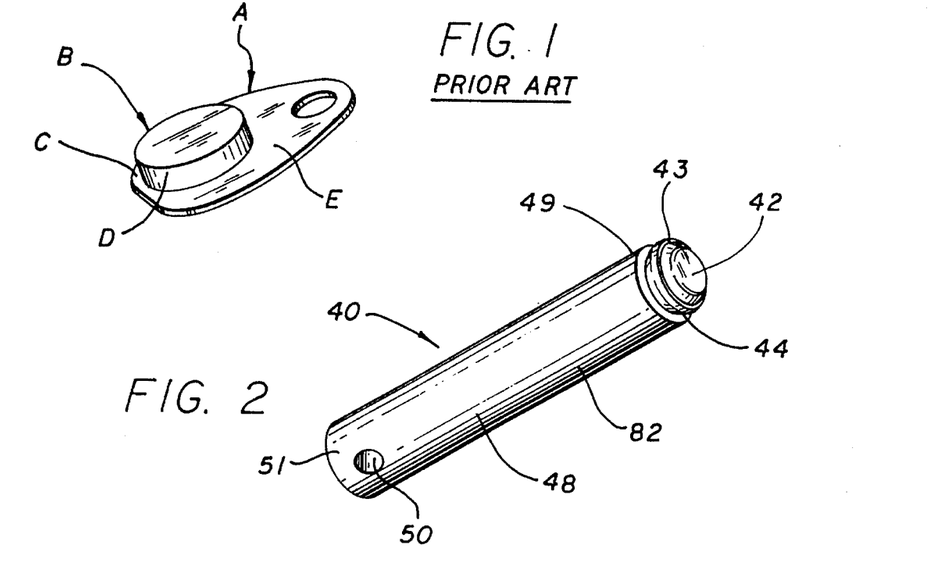
FIG. 1 is a perspective view of a prior-art electronic key fob.
FIG. 2 is a perspective view of an implement or key which embodies features of the present invention.

FIG. 1 illustrates a prior-art form of key or operating implement A for a lock mechanism. This device includes a ROM (not shown) within a flat coin-like or disk-like can or container B. The container B provides a circular contact surface C and an annular edge surface D. The surfaces C and D engage respective contact surfaces (not shown) of a receptacle of a lock mechanism. The container B is mounted on a flat tab-like holder, handle or fob E for manipulation of the device.

In operation, the can B of the key A must first be transversely aligned with the receptacle and then inserted into the receptacle. This requires a manipulation of the "key" that is at best awkward and unfamiliar to most users. In particular, the user's hand and the tab or fob structure tend to block or obscure the user's view of the can and the receptacle and thereby make the alignment of the can with the receptacle difficult. Further, holding the fob at its end away from the can to improve visibility increases another difficulty: awkwardness and difficulty of use. In this regard, holding the fob at the remote end and then manipulating the fob to first align the can with the receptacle and then move the can into the receptacle in a tight fit are a challenge to the hand-eye coordination and dexterity of the user. In other words, using the fob to maneuver the can, which is at the other end of the fob, first in a direction parallel to the plane of the fob and then in a direction transverse to the plane of the fob is an awkward, difficult and unfamiliar movement. Also, as noted above, the alignment of the user's fingers with the fob (and thus at right angles to the direction of forward movement of the can into the receptacle) tends to emphasize or exaggerate the multiple-step alignment/insertion nature of the manipulation of the key.

Referring initially to FIG. 2, the illustrated implement 40 has a small elongated generally cylindrical shape, about 1 to about 3 inches long and about 0.20 to about 0.50 inches in diameter. An implement measuring 1.55 inches in overall length and 0.30 inches in maximum diameter has proven desirable, handy and useful. The implement 40 comprises a handle 48 which extends generally from end to end of the implement. At the forward end 49 of the handle 48 there is a spaced-apart pair of electrical contacts, a central inner contact 42 and a circular outer contact 44. The contacts 42, 44 are separated by an annular insulating member 43. At the rear end 51, of the handle are attachment means in the form of a hole 50 for releasable connecting to a key ring or key chain.

Now referring to FIGS. 3a, 3b and 3c, the components of the illustrated implement 40 are shown in schematic exploded views.

A cylindrical metal can 52 is received in a cavity 47 in the forward end of the handle 48. The can 52 also provides the outer implement contact 44. The can 52 has an open and enlarged forward end portion 53. This end portion 53 forms a cup or receptacle 54 that has an annular side wall 55.

A cup-shaped insulating member 43 of nylon or the like is disposed in the end portion receptacle 54 when the implement is assembled. The insulating member 43 has a circular base wall 58 and an annular side wall 60. The side wall 60 is somewhat higher than the side wall 55 of the can end portion 53 for reasons to be explained below.

The implement 40 also includes the metal central inner electrical contact 42 which has a flat forwardly facing circular contact surface 42a. The central contact 42 also has a rearmost portion that has a cylindrical side wall 66, and a bevelled frustoconical annular forward portion 68 which reduces in diameter from the side wall 66 in the forward direction to the surface 42a. The central contact 42 is disposed within the cup-shaped insulating member 43. To maintain the central contact 42 and the insulating member 43 in place relative to the can 52, the annular side wall 55 of the enlarged portion 53 is formed or crimped radially inwardly over the insulator side wall 60 and the central contact walls 66 and 68.(See FIG. 5). As noted above, the insulation wall 60 maintains a separation between the inner and outer contracts 42, 44.

A molded plastic T092 memory chip package 70 is physically secured within the can 52. The package 70 contains a memory chip (not shown) and has electrical leads 42b, 44b connected to the chip and extending outwardly for connection to the implement contacts 42, 44. Lead 42b extends forwardly through a central hole 76 in the insulating member base wall 58 and is in electrical contact with the central contact 42. In this regard, the central contact 42 has a central recess 63 at its rear surface; the end of the lead 42b is secured in the recess 63 as by a glob of electrically conductive adhesive to maintain the electrical connection. The other lead 44b may be similarly secured to the can 52 of the outer contact 44.

As noted above, the cylindrical handle member 48 which may be made of a suitable insulating material, has the cylindrical cavity 47 at its forward end which receives the rear portion of the can 52.

The implement is generally the size of, or somewhat smaller than, an ordinary key and may be reasonably attached to a key chain or key ring along with the other keys, if any, of the user.

As illustrated in FIG. 5, the receptacle 21 of the lock mechanism is a complementary shape and arrangement to the implement 40. The receptacle 21 includes a ring-shaped outer contact 24 and a central inner contact 22. The contacts are separated by an insulating member 28. Both contacts 22, 24 are in electrical contact with the electronics (shown schematically as a black box 84) of the lock mechanism.

Figures 4A, 4B, 4C:
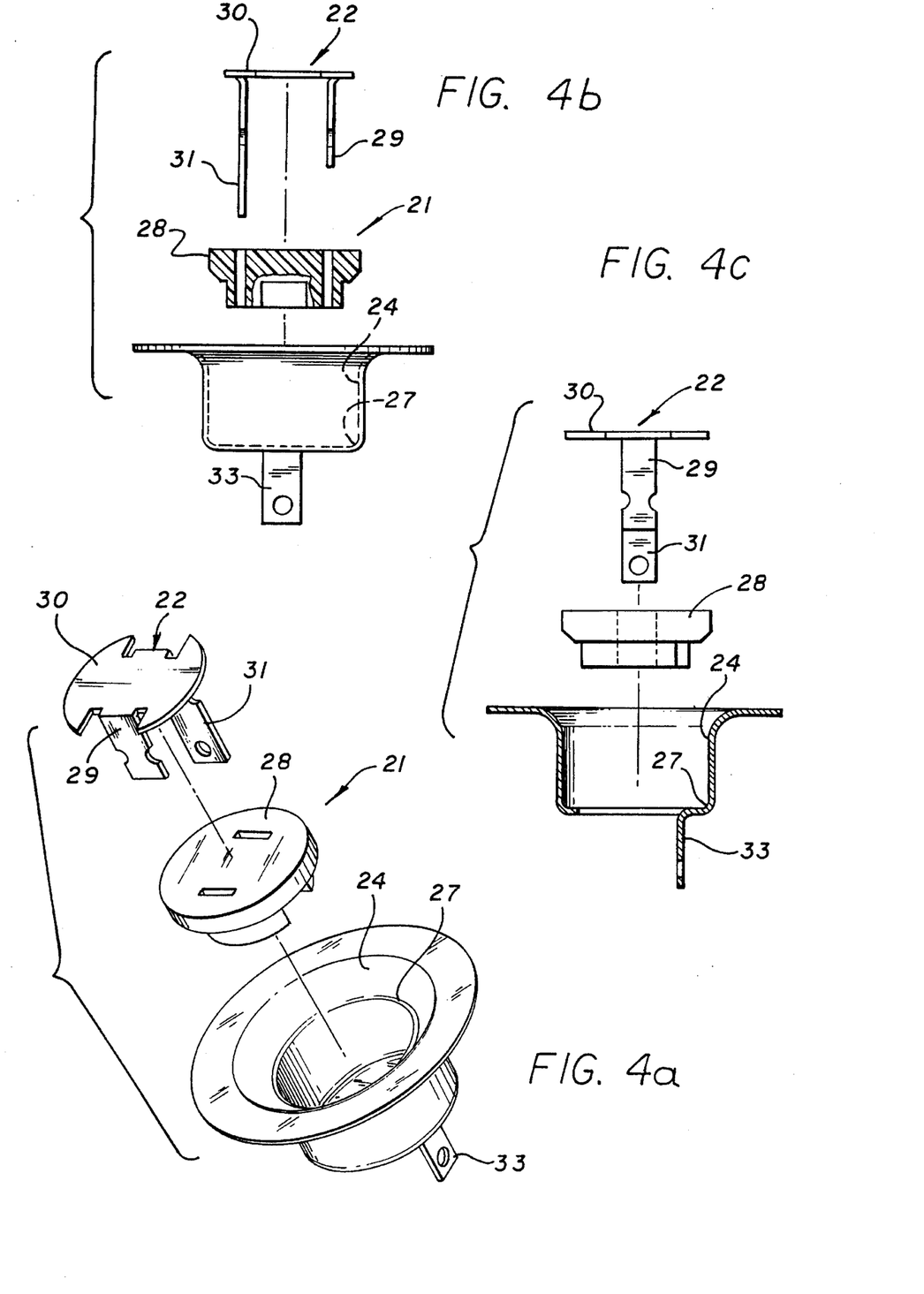
FIGS. 4a, 4b and 4c are a schematic exploded perspective and side sectional views showing the receptacle of a lock mechanism for use with the implement of FIG. 1, the lock mechanism also embodying features of the present invention.

More particularly, as shown in FIGS. 4a, 4b and 4c, the illustrated outer contact 24 is a generally tubular formed sheet-metal part having an annular cylindrical inner contact surface 24a only slightly larger than the mating annular contact surface 44a of the implement. This annular cylindrical contact surface 44a consists of the rearward uncrimped portion of the annular side wall 55 of the enlarged end portion 53 of the can. The close fit between surfaces 44a and 24a ensures sufficient electrical contact between them when the forward end of the implement is inserted into the receptacle.

Rearwardly of the contact surface 24a, the tubular part is reduced in diameter to provide an interior lip 27 which receives an annular insulator disk 28 of nylon or the like. The central inner contact 22 is also a formed sheet-metal part having a generally flat disk-like forward portion that provides the forwardly facing inner contact surface 22a. The inner contact 22 also has rearwardly extending legs 29 and 31 that extend rearwardly through the openings through the insulator disk 28. (See FIG. 5). The leg 31 is connected by one electrical lead 22b to the electronics 84. The leg 29 is for support.

The tubular outer contact part has a rearwardly extending leg 33 which is connected by an electrical lead 24b to the electronics 84 to connect the outer contact 24 to those electronics.

FIG. 5 shows the front end 49 of the implement 40 aligned with the receptacle 21 of the lock mechanism and moved axially forwardly, part way into the receptacle. When the front end is fully inserted, the central implement contact surface 42a engages the central contact surface 22a of the lock mechanism, while the implement outer contact wall portion 44b engages the annular inner wall 24b of the outer contact 24 of the lock mechanism. Thus the inner contacts 22, 42 and the outer contacts 24, 44 are respectively placed in electrical engagement with one another.

In momentary-engagement embodiments of the lock, this contact need only be on the order of, for example, 20 to 60 milliseconds for the desired information to be transmitted between the implement and the lock mechanism. The implement may then be withdrawn axially away from the receptacle to end the electrical contact.

It will be noted that because of the ring-like construction and engagement of the outer contacts 24, 44 with one another, and the aligned central location of the inner contacts 22, 42 with one another, the rotational attitude or position of the implement relative to the receptacle does not matter in achieving the desired contact between the respective contacts. This allows the user to simply grasp the handle without being concerned about any particular rotational attitude of the handle.

The desired insertion of the implement 40 into the receptacle 21 is aided and facilitated by a rounded corner 24d provided around the inside forward edge of the outer contact 24, and the bevelled guide surface 68 provided at the forward end of the implement. These surfaces act to guide the forward end of the implement into the receptacle. The diameter of the annular cylindrical rear contact portion 44b of the outer contact 44 of the implement and the diameter of the inwardly facing annular surface 24b of the outer contact of the receptacle are held to relatively close tolerances so that necessary contact between those surfaces is achieved whenever the implement is inserted forwardly into the receptacle.

The illustrated implement and method of fabricating the implement provide a variety of advantages over the prior art.

The implement is small and compact and thus can be readily stored and carried by the user.

Of most importance, as shown in FIG. 6, the implement can be easily and comfortably held and manipulated by the user with one hand using a thumb and one or two other fingers. As noted above, the thumb and fingers are aligned with the axis of the implement. This makes the operation of the implement particularly easy and comfortable for the user. When the handle is grasped by the user the forward end is fully exposed and visible to the user. It also affords a clear view of the lock receptacle. This allows easy alignment of the front end with the receptacle and insertion into the receptacle in essentially one single comfortable motion. The user feels like he or she is simply pointing and advancing a finger.

Further, the handle can simply be grasped and does not require a particular rotational orientation before it is moved forwardly into the receptacle. It does not require rotation or other movement in addition to the forward and withdrawal axial movement.

Thus, there is a simple and unobstructed integrated action which combines the alignment, with the forward movement into contact. In forms of the invention where only momentary engagement is required to transfer data, the withdrawal is also essentially integrated into the combined action.

The implement may be used easily, quickly and comfortably with a minimum of physical demand for dexterity, patience or the like from the user. In sum, the present invention represents a very significant ergonomic advancement over the prior art. "Ergonomics" is defined in *McGraw Hill Dictionary of Science and Technology Terms*, 3d Ed., 1984, as "the study of human capability and psychology in relation to the working environment and the equipment operated by the worker." The term is used herein in a broader sense, not limited to the work environment. Thus, as noted above, the impact of this invention is not limited to the user's physical activities, but also encompasses the user's psychology, i.e, his or her state of mind and emotional likes and dislikes as related to product acceptance or nonacceptance.

Various changes may be made in the specific details of the structure as shown and described without departing from the spirit and scope of the invention as set forth in the attached claims. By way of example, in an alternative preferred embodiment the memory chip device rather than being in a T092 package may take the form of a memory chip 170 directly attached and electrically connected to one of the implement contacts, such as to the rear wall of the central contact 142.

Here that contact 142 carries a generally central conductive lower boss 142', and insulating and conductive rings 158 and 153 respectively. The memory chip or die 170 bridges the gap between the boss 142' and conductive ring 153, and the latter ring makes contact (as by conductive adhesive, ultrasonic bond etc.) with the can 152 to complete the operative electrical connections to the chip 170.

What is claimed is:

1. A compact miniature key-length hand-holdable implement for use with an electronic lock, the lock having a spaced-apart pair of electrical lock contacts, namely a generally centered inner contact and an outer contact arranged radially outwardly from the inner contact, the implement comprising:

an electronic memory device within the implement, an elongated handle having a longitudinal axis, a pair of implement contacts disposed at the front end of the handle for engagement with such lock contacts on such an electronic lock, the implement contacts being electrically connected to the memory device, and the implement having no other electrical contact, a first of the implement contacts being generally centered and a second of the implement contacts being arranged radially outwardly from said first implement contact, said implement contacts being arranged and positioned to respectively engage such lock contacts in all rotational orientations of the implement about its longitudinal axis by virtue of movement of the implement substantially solely along the axis of the handle, to permit substantially axial movement of the implement contacts into engagement with such lock contacts in any random rotational orientation of the implement, and to permit achievement of desired electrical interconnection with such lock contacts by substantially axial movement of the implement into engagement with and out of engagement with such lock contacts without other or added rotational or transverse movement of the implement, said electrical interconnection automatically transferring data from said memory device through said contacts to such electronic lock, said handle being sized and arranged for being held by one hand of the user using a thumb and at least one other finger, with the thumb and finger being aligned with the axis of the handle and with the hand being positioned to provide a clear unobstructed view of the front end of the implement and the area of such lock contacts when the implement front end is aimed generally toward such lock contacts.

2. The combination of the implement of claim 1 with such an electronic lock; wherein:

said lock contacts are disposed in a receptacle and said receptacle includes lock guide means to guide the front end of the implement into the receptacle and thereby align the respective contacts; and the implement includes implement guide means that engage the lock guide means of the lock receptacle to aid in guiding the implement into the receptacle.

3. The combination of claim 2, wherein:

the implement guide means are in the form of a generally frustoconical end on said implement central contact.

4. The implement of claim 1 wherein the implement has a length of from about one to about three inches and a maximum transverse dimension of from about 0.20 to about 0.50 inches.

5. The implement of claim 1, wherein:

said electronic memory device holds electronic code means for transfer as data through said engaging contacts to such an electronic lock to unlock such lock.

6. The implement of claim 1, wherein:

the implement contacts and the memory device require only momentary engagement of the contacts to achieve desired data transfer so that said alignment, insertion and withdrawal of the implement are achieved and sensed essentially as a single continuous integrated action.

7. The implement of claim 1 wherein said second implement contact is a generally circular ring portion.

8. The implement of claim 7 wherein said first implement contact has a generally flat circular forward contact surface that is coaxial with said ring portion of said second implement contact.

9. The implement in claim 8 wherein said handle comprises an outer sleeve of insulating material that has a generally cylindrical outer surface.

10. A compact hand-holdable implement for use with an electronic lock, said implement comprising:
   a) a base can member of metal having a generally annular forward end portion that is transversely enlarged to define a receptacle area, said annular forward end portion having an axis,
   b) a generally cup-shaped intermediate member of electrical insulating material and having a generally annular side wall, said intermediate member being disposed within the generally annular forward end portion receptacle area,
   c) a metallic central member that is disposed within the cup-shaped intermediate insulating member, said central member having a generally cylindrical wall that is inclined radially inwardly in the forward direction, and
   d) an elongated handle having a longitudinal axis, and extended rearward from the forward end portion of the base can member in such a way that the longitudinal axis of the elongated handle is aligned with said axis of the forward end portion;
   the can annular forward end portion being permanently deformed radially inwardly against the portion of the side wall of the intermediate member that is adjacent to the inclined wall of the central member so as to permanently secure the central member and the intermediate member to the can member,
   the side wall of the intermediate insulating member being higher than the end portion of the can member so as to maintain electrical separation between the end portion of the can member and the central member,
   whereby the central member provides an inner contact and the end portion of the can member provides an outer contact, and
   d) an electronic memory device disposed within and electrically connected to the base can member, said memory device also being electrically connected to said central member.

11. The implement of claim 10 wherein said forward end portion is a generally circular ring portion.

12. The implement of claim 11 wherein said central member has a generally flat circular forward contact surface that is coaxial with said ring portion of said forward end portion.

13. The implement of claim 12 wherein said base can member includes a tubular rear portion, and said implement further includes a tubular handle member of insulating material that has a generally cylindrical outer surface and is mounted on said tubular rear portion.

14. A method of using a compact hand-holdable implement with an electronic lock, which implement contains an electronic memory device and comprises an elongated handle that has an axis, the handle having a pair of spaced-apart electrical contacts at its front end that are connected to the memory device, one contact being an inner contact that is generally centered and the other contact being an outer contact disposed radially outwardly from the inner contact, the lock having a receptacle for receiving the front end of the implement, the receptacle having a mating spaced-apart pair of electrical contacts, one of the contacts being an inner central lock contact and the other of the contacts being an outer lock contact disposed radially outwardly of the inner lock contact; at least one of the implement and receptacle having circularly .or cylindrically symmetrical structure so that the two inner contacts come into mutual engagement, and the two outer contacts come into mutual engagement, upon insertion of the implement front end into the receptacle regardless of rotational orientation about the handle axis, said method comprising the steps of:
   1) grasping the handle of the implement with one hand using the thumb and at least one other finger of that hand, with the thumb and finger being generally aligned with the axis of the handle and sufficiently spaced from the front end to provide clear visibility of the front end to the user, the grasping being performed randomly as to, and without regard for, the rotational position of the handle about its axis,
   2) moving the implement with said hand in a movement which approximates pointing the thumb and said grasping finger of said hand toward the receptacle of the lock mechanism while also solely advancing the front end of the implement forward generally in the direction in which said thumb and finger are pointing and into the receptacle,
   3) maintaining the contacts at the front end of the implement in engagement with the respective contacts in the receptacle so as to automatically transfer data from the memory device through the engagement contacts to the electronic lock, and
   4) withdrawing the implement from the receptacle by solely rearward movement generally aligned with the axis of the implement and the direction of the thumb and finger;
   the procedure from steps 2 through 4 inclusive being performed without necessarily imparting movement to the implement either transversely with respect to its axis or rotationally about its axis, add without deforming the implement.

15. The method of claim 14 wherein only momentary engagement of between 2 and 600 milliseconds is required to effect the desired transfer of data, and the withdrawal of the implement from the receptacle immediately follows its insertion so as to achieve essentially a single combined integrated action of aligning, inserting and withdrawing the implement.

16. In combination:
   an electronic lock, having electrical lock contacts for receiving identifying data to operate the lock electrically;
   a hand-holdable implement for supplying identifying data to operate the lock, said implement having a longitudinal axis and comprising:
      an elongated handle, disposed along the longitudinal axis and having two ends,
      an electronic memory device, within the implement, holding identifying data, and
      electrical implement contacts at one end of the handle and electrically connected to the memory device, for engaging the lock contacts to conduct the data into the lock; and wherein:
   said implement contacts are arranged and positioned to respectively engage and electrically interconnect with the lock contacts in all rotational orientations of the implement about its axis, to enable said data conduction and cause said lock electrical operation; and the lock operation requires no rotation of the implement.

17. The combination of claim 16, wherein:

the lock has a first mating structure for mating with the implement;

the implement has a second mating structure for mating with the lock;

at least one of the mating structures comprises a circularly symmetrical surface for mutually positioning the implement contacts with respect to the lock contacts; and the circularly symmetrical surface is substantially centered with respect to the implement longitudinal axis.

18. The combination of claim 16, wherein:

the lock has a first mating structure for mating with the implement;

the implement has a second mating structure for mating with the lock;

one of the mating structures is formed as a receptacle;

the other of the mating structures is formed for insertion into the receptacle regardless of rotational orientation of the implement about its longitudinal axis; and at least one of the mating structures has guide means to help a user guide the two mating structures into operative engagement, with said other mating structure inserted into the receptacle, to operate the lock regardless of rotational orientation of the implement about its longitudinal axis.

19. The combination of claim 18, wherein:

the guide means of said other mating structure comprise a generally frustoconical end on said other mating structure;

said frustoconical end being substantially centered with respect to the longitudinal axis of the implement, when the first and second mating structures are mutually engaged.

20. The combination of claim 16, wherein:

the implement has no other electrical contact.

21. The combination of claim 16, wherein:

the lock contacts comprise a first contact structure;

the implement contacts comprise a second contact structure; and at least one of the first and second contact structures comprises:

an inner contact that is generally centered with respect to the longitudinal axis of the implement, when the implement and lock are mutually engaged, and a circumferential outer contact arranged radially outwardly from the inner contact, about the periphery of said one of the contact structures.

22. The combination of claim 21, wherein the other of the first and second contact structures comprises:

a first contact that is generally centered with respect to the longitudinal axis of the implement; and a second contact that is arranged radially outwardly from said first contact.

23. The combination of claim 16, wherein:

said engagement and electrical interconnection in all rotational orientations is effected through movement of the implement to the lock substantially axially, substantially parallel to the longitudinal axis of the implement; and said handle is sized and arranged for holding by one hand of the user using a thumb and at least one other finger, with the hand being positioned to provide a clear unobstructed view of the front end of the implement and the area of such lock contacts when the longitudinal axis of the implement is aimed generally toward such lock contacts.

* * * * *